United States Patent
North et al.

(10) Patent No.: US 12,315,983 B2
(45) Date of Patent: May 27, 2025

(54) SYSTEM AND METHOD FOR THERMALLY CONTROLLING A WAX ENCAPSULATED ANTENNA DURING BURST TRANSPORT

(71) Applicant: Dell Products, LP, Round Rock, TX (US)

(72) Inventors: Travis C. North, Cedar Park, TX (US); Qinghong He, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 514 days.

(21) Appl. No.: 17/553,438

(22) Filed: Dec. 16, 2021

(65) Prior Publication Data

US 2023/0198118 A1 Jun. 22, 2023

(51) Int. Cl.
| | | |
|---|---|---|
| *H01Q 1/00* | (2006.01) | |
| *G01K 7/02* | (2021.01) | |
| *G01K 7/22* | (2006.01) | |
| *G01K 13/00* | (2021.01) | |
| *H01Q 1/27* | (2006.01) | |
| *H01Q 1/40* | (2006.01) | |

(52) U.S. Cl.
CPC ............... *H01Q 1/002* (2013.01); *G01K 7/02* (2013.01); *G01K 7/22* (2013.01); *G01K 13/00* (2013.01); *H01Q 1/00* (2013.01); *H01Q 1/273* (2013.01); *H01Q 1/40* (2013.01)

(58) Field of Classification Search
CPC .......... H01Q 1/002; H01Q 1/273; H01Q 1/00; H01Q 1/40; G01K 13/00; G01K 7/02; G01K 7/22; G01K 3/005
See application file for complete search history.

(56) References Cited

U.S. PATENT DOCUMENTS

| | | | |
|---|---|---|---|
| 8,728,568 B2 | 5/2014 | Bhakta | |
| 10,119,526 B1 * | 11/2018 | Peeters | A61M 5/2053 |
| 11,389,112 B1 * | 7/2022 | Miller | A61B 5/6843 |
| 2009/0154113 A1 * | 6/2009 | MacDonald | H05K 7/20518 29/829 |
| 2010/0028758 A1 | 2/2010 | Eaves | |
| 2015/0075186 A1 | 3/2015 | Prajapati | |
| 2018/0068926 A1 * | 3/2018 | Krajniak | H01L 23/427 |
| 2020/0110451 A1 * | 4/2020 | He | G06F 1/1684 |

FOREIGN PATENT DOCUMENTS

CA 2384621 A1 3/2001

OTHER PUBLICATIONS

G. Ali Mansoori, "Phase Behavior in Petroleum Fluids (A Detailed Descriptive and Illustrative Account)," 33 pages, Jan. 1, 2009.

* cited by examiner

*Primary Examiner* — Hai V Tran
(74) *Attorney, Agent, or Firm* — Prol Intellectual Property Law, PLLC; H. Kenneth Prol

(57) ABSTRACT

An information handling system including a encapsulated antenna may comprise the encapsulated antenna encapsulated in a phase-changing compound to absorb heat, the antenna and the compound enclosed within an outer encapsulated antenna housing a wireless interface device with a 5G radio to generate burst signals to be transmitted via the encapsulated antenna, an information handling system chassis having a skin surface coming into contact with human skin during execution of the information handling system, and a temperature sensor to determine an operable temperature of the antenna reaching a known phase transition point at which the phase-changing compound changes states at least partially from solid to liquid.

14 Claims, 4 Drawing Sheets

SYSTEM AND METHOD FOR THERMALLY CONTROLLING A WAX ENCAPSULATED ANTENNA DURING BURST TRANSPORT

FIELD OF THE DISCLOSURE

The present disclosure generally relates to wireless communication performance for computing devices. More specifically, the present disclosure relates to a system for controlling power throttling for a wax-encapsulated antenna to ensure portions of a chassis enclosing the antenna that come into contact with human skin stay within preset tolerances.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
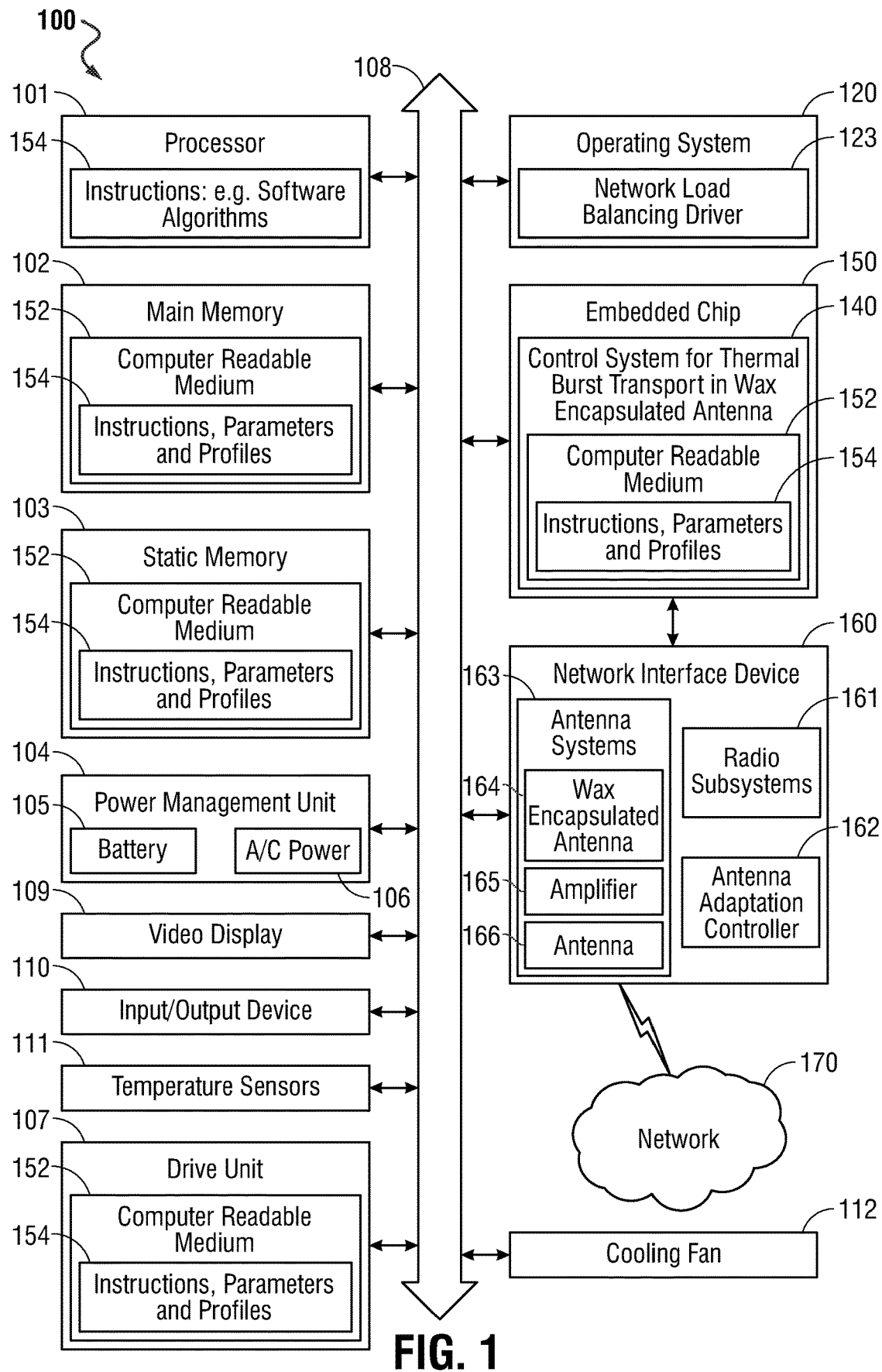
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Mobile devices frequently coming into contact with a user's skin (e.g., hands, laps, etc.) may employ a variety of cooling mechanisms designed to ensure the portions of the exterior surface or "skin surface" of such devices that frequently contact a user's skin stay at or below temperatures most users find comfortable. The components housed within a chassis of such an information handling system in various embodiments described herein that are most likely to generate heat affecting the skin surface temperature include various processors (e.g., central processing unit (CPU), or graphics processing unit (GPU)), power systems or battery, and antennas and radio subsystems used in wireless communication with networks connected to the internet. In particular, antennas and radio subsystems operating under the 5G standard with high data bandwidth may consume around 1 Watt of power and generate heat during operation.

Existing systems employ structures such as fans, heat sinks, cooling strips, and various cooling methods primarily pointed at capping or down-throttling power supplied to these heat-producing components (e.g., processors and antennas). However, the new cellular 5G standard toward which communications for many mobile computing devices has shifted requires transmission of data in short bursts that markedly increase the power drawn by antennas over a short time period. In order to capture the benefits of the new 5G standards, including greater data transmission speed, mobile computing device antennas need to perform such burst transmissions routinely. Existing cooling methods intended to keep skin temperatures of portions of an information handling system chassis at or near the 5G antennas or radios at or below a user's comfort level may involve throttling of power delivered to the antenna during such bursts, and limiting frequency of such bursts. A solution that maintains the mobile computing device skin temperature at or below user comfort levels and allows for such burst transmissions is needed.

A control system for thermal burst transport in a wax encapsulated antenna in embodiments of the present disclosure addresses these issues by delaying default cooling mechanisms involving throttling of power delivered to the antenna long enough for 5G burst transmissions to occur. In embodiments described herein, the control system for thermal burst transport in a wax encapsulated antenna may ensure the skin temperature of the information handling system chassis housing near such an antenna does not exceed a threshold comfort value by transceiving data in such bursts via a wax encapsulated antenna capable of absorbing heat generated during burst transmission.

The control system for thermal burst transport in a wax encapsulated antenna in embodiments described herein may receive temperature measurements from a thermal sensor co-located with the antenna and trigger a countdown timer when the antenna temperature rises to the known phase transition point for the wax surrounding material of the antenna. The length of the countdown timer may be set based on the energy per degree Celsius that the wax encapsulation material can absorb, as well as the current bitrate of data transceiving via the antenna. In other words, the control system for thermal burst transport in a wax encapsulated antenna may set the countdown timer to expire prior to depleting the wax encapsulating material's ability to absorb heat generated by the antenna during a burst transmission. Once this countdown timer has run to zero, the control system for thermal burst transport in a wax encapsulated antenna may trigger existing thermal control systems to throttle power to the antenna in order to maintain the skin surface temperature of the chassis housing the antenna. In another embodiment, at zero, the control system for thermal burst transport in a wax encapsulated antenna may limit burst frequency or suspend burst transmissions for a period. In such a way, the control system for thermal burst transport in a wax encapsulated antenna may extend the time period in which the antenna may continue to transceive data at a higher power (e.g., by a time period equivalent to the countdown timer value).

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palm-top computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include an embedded chip 150 that may be any device or devices that execute instructions, parameters, and profiles 154 of a control system for thermal burst transport in a wax encapsulated antenna 170 to monitor and control a period of time in which a wax encapsulated antenna 164 may draw high rates of power, transceive larger volumes of data, and consequently manage increases in the temperature of a chassis enclosing the information handling system 100 and the wax encapsulated antenna 164. The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 101 illustrated in FIG. 1, hardware or software control logic, or any combination thereof. Additional components of the information handling system 100 may include one or more storage devices 103 or 107, a network interface device 160, one or more communications ports for communicating with external devices, as well as various input and output (I/O) devices 110, such as a keyboard, a mouse, or any combination thereof. A power management unit 104 supplying power to the information handling system 100, via a battery 105 or an alternating current (A/C) power adapter 106 may supply power to one or more components of the information handling system 100, including the processor 101, the network interface device 160, and the temperature sensors 111.

The information handling system 100 may include one or more types of temperature sensors 111 (e.g., thermocouples, resistance temperature detectors, thermistors, optical thermal sensors, or semiconductor based integrated circuits), which may be strategically located nearby or between various components of the information handling system 100 and the chassis enclosing it. For example, a temperature sensor 111 may be located at or near a portion of the wax encapsulated antenna 164 in order to measure a temperature of the outer wax encapsulation layer or the antenna element encapsulated within the wax encapsulation layer. As another example, a temperature sensor 111 may be located between the chassis outer surface or skin surface and the wax encapsulated antenna 164 or another antenna 166 within the antenna systems 163 to measure the effect of the operation of the antenna (e.g., 164 or 166) on the outer surface or skin surface temperature of the outer layer of the chassis enclosing the information handling system 100. As yet another example, a temperature sensor 111 may be located between the chassis outer surface or skin surface and the processor 101 to measure the effect of the processor operation on the surface or skin temperature of the outer layer of the chassis enclosing the information handling system 100. In still another example, a temperature sensor 111 may be located just beneath or incorporated within the chassis enclosing the information handling system 100 in order to directly measure the temperature on the surface or skin temperature of the outer layer of the chassis enclosing the information handling system 100.

The information handling system 100 may further include video display 109. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, embedded controllers (e.g., 150) or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include a control system for thermal burst transport in a wax encapsulated antenna 140, operating system (OS) software 120, application software, BIOS software, or other software applications or drivers (e.g., 123) detectable by processor type 101.

The OS 120 in an embodiment may be capable of executing a plurality of software applications, including, for example, a network load balancing driver 123. The network load balancing driver 123 in an embodiment may track bandwidth of all software applications executing under the OS 120, pursuant to which data is transferred via a wireless link to the network 170. Additionally, the network load balancing driver 123 in an embodiment may operate to balance the transceiving of data packets pursuant to execution of software applications by the OS 120 across a plurality of network interface devices (e.g., 160).

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices, display 109, or the network interface device 160, or the like.

Information handling system 100 in an embodiment may comprise a mobile computing device, such as a laptop or tablet computer, as described in greater detail herein, or may, in some embodiments, comprise a docking station for such a mobile computing device. The information handling system 100 in such an embodiment may operate on wired and wireless links to connect with the network 170 via a network Access Point (AP), as described in greater detail herein.

The network interface device 160 may provide connectivity of the information handling system 100 to the network 170 via a network AP in an embodiment. The network 170 in some embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols or Bluetooth® protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In an embodiment, the network interface device 160 may be communicatively coupled to one or more antenna systems 163 used to provide one or more separate communication channels to the network 170. Such communications channels may be found in any communication network described herein. The antennas 163 may support Wi-Fi 6, Wi-Fi 6e, or a 5G wireless communication protocol so that relatively higher amounts of data may be transceived by the information handling system 100 to any communication network to which the information handling system 100 is communicatively coupled in some embodiments.

The antenna systems 163 in an embodiment may include a power amplifier 165, various antennas 166, and at least one wax encapsulated antenna 164. As described herein, the 5G communication standard may allow for or require transceiving of data packets through the network interface device 160 in bursts that draw higher power from the PMU 104 than non-burst transmissions. The amplifier 165 in an embodiment may facilitate such higher power draws to the antennas 166 or the wax encapsulated antenna 164. As the power drawn by the antennas 166 or the wax encapsulated antenna 164 increase in such a way, the temperatures of those antennas (e.g., 164 or 166) and portions of the chassis directly surrounding those antennas may similarly increase. Existing cooling methods intended to keep skin temperatures of the chassis at or below a user's comfort level may involve throttling of power delivered from the power management unit 104 to the antennas (e.g., 164 or 166) during such bursts, inhibiting such bursts to occur or complete.

The control system for thermal burst transport in a wax encapsulated antenna 140, executing code instructions 154 via processor 101 or via an embedded chip 150 in an embodiment addresses these issues by delaying default cooling mechanisms involving throttling of power delivered to the wax encapsulated antenna 164 for controlled duration based on wax encapsulation capabilities to absorb antenna generated hear for 5G burst transmissions to occur. The wax encapsulated antenna 164, as described in greater detail below with respect to FIG. 2 may comprise an antenna wholly or partially encapsulated by a heat absorbing wax material operating as a thermal battery. The wax encapsulation layer of such a wax encapsulated antenna 164 may be capable of storing thermal energy produced by the encapsulated antenna element without altering the exterior temperature of the wax encapsulation layer (e.g., the portion of the wax encapsulated antenna affecting the skin surface temperature of the chassis) by undergoing a phase change. In other words, the wax encapsulation layer of the wax encapsulated antenna 164 in such an embodiment may absorb a portion of the thermal energy emitted by the encapsulated antenna element during a power-amplified burst transmission for a short period of time, such that the encapsulated antenna element does not cause a corresponding additional increase in skin surface temperature or at least delays it during this short period of time.

The control system for thermal burst transport in a wax encapsulated antenna 140 in an embodiment may receive temperature measurements from a thermal sensor 111 co-located with the wax encapsulated antenna 164 and capable of measuring temperatures of the antenna element encapsulated within the wax encapsulation layer. When the wax encapsulated antenna 164 temperature rises to the known phase transition point for the wax coating of the wax encapsulated antenna 164, the control system for thermal burst transport in a wax encapsulated antenna 140 may initiate a countdown timer. The length of the countdown timer may be set based on the energy per degree Celsius that the wax encapsulation material can absorb, as well as the current bitrate of data transceiving via the wax encapsulated antenna 164, and power being supplied to the wax encapsulated antenna 164. In other words, the control system for thermal burst transport in a wax encapsulated antenna 140 may set the countdown timer to expire prior to depleting the wax encapsulating material's ability to absorb heat generated by the wax encapsulated antenna element during a burst transmission. Once this countdown timer has run to zero, the control system for thermal burst transport in a wax encapsulated antenna 140 may trigger existing thermal control systems to throttle power to the antenna 164 in order to maintain the skin surface temperature of the chassis housing the information handling system 100. In such a way, the control system for thermal burst transport in a wax encapsulated antenna 140 may extend the time period in which the wax encapsulated antenna 164 may continue to transceive data at a higher power (e.g., by a time period equivalent to the countdown timer value) as compared to an antenna that is not wax encapsulated.

The control system for thermal burst transport in a wax encapsulated antenna 140 in an embodiment may determine the transceiving bitrate (e.g., 20 Gbit/s) via communication with the network interface device 160. In another aspect of an embodiment, the control system for thermal burst transport in a wax encapsulated antenna 140 may determine the power being supplied to the wax encapsulated antenna 164 via communication with the power management unit 104 or one or more components of the network interface device 160. For example, the power management unit may supply one Watt of power to the wax encapsulated antenna 164 for transceiving of data in a burst. In other embodiments, the power management unit 104 may deliver other amounts of power. The control system for thermal burst transport in wax encapsulated antenna 140 in an embodiment may determine the known Wattage supplied to the wax encapsulated antenna 164 via communication with the power management unit 104, or the network interface device 160, for example. In some embodiments, the network interface device 160 may include a power amplifier 165 operating to amplify the amount of power supplied to the wax encapsulated antenna 164. In such an embodiment, the network interface device 160 may indicate to the control system for thermal burst transport in a wax encapsulated antenna 140 the amount of amplified power being drawn by the wax encapsulated antenna 164 at a given time.

The antenna adaptation controller 162 may execute instructions as disclosed herein for monitoring wireless link state information, wireless link configuration data, network slice data, or other input data to generate channel estimation and determine antenna radiation patterns. For example, the antenna adaptation controller 162 in an embodiment may gather beacon data received from one or more nearby access points (APs) for the network 170 describing channels available for communication with that AP, as well as various current traffic metrics for communications on those channels. More specifically, such beacon information may provide a relative signal strength indicator (RSSI), identification of the network 170 as private or public, identification of the network 170 as compatible with multiple user, multiple input, multiple output (MU-MIMO) communications, high available data rate, levels of channel contention, and current load of communications at the AP. Such beacon data may include such measurements or indications for each of the channels within which the AP is capable of transceiving data, and the beacons may be received in regular intervals. Such received beacon data may be stored in an embodiment at the main memory 102, or in temporary BIOS memory accessible in kernel mode. Instructions or a controller may execute software or firmware applications or algorithms which utilize one or more wireless links for wireless communications via the network interface device 160 and the plurality of antenna systems 163 for the plurality of supported wireless protocols as well as other aspects or components. Antenna adaptation controller 162 may also control selection from among an available plurality of antennas 164 or 166 via antenna switching or adjust antenna matching or antenna directionality in some cases for antenna systems 163, tune multi-frequency antennas for different bands, or adjust antenna directionality such as via phase shifting, use of parasitic elements or other similar techniques.

The network interface device 160 in an embodiment may further include a radio subsystem 161 which may operate to modulate and demodulate signals transceived within a WWAN or WLAN format, set signal transmission power levels or sensitivity to signal reception, select channels or frequency bands, and conduct other functions in support of a wireless transmission from the information handling system 100 to the communication network 170.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of a control system for thermal burst transport in a wax encapsulated antenna 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The control system for thermal burst transport in a wax encapsulated antenna 140 may utilize a computer-readable medium 152 in which one or more sets of instructions 154 such as software may be embedded. The instructions 154 may embody one or more of the methods or logic as described herein. For example, instructions relating to the control system for thermal burst transport in a wax encapsulated antenna 140, software algorithms, processes, and/or methods may be stored here.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the control system for thermal burst transport in a wax encapsulated antenna 140 may be stored in static memory 103, or the drive unit 107 on a computer-readable medium 152 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
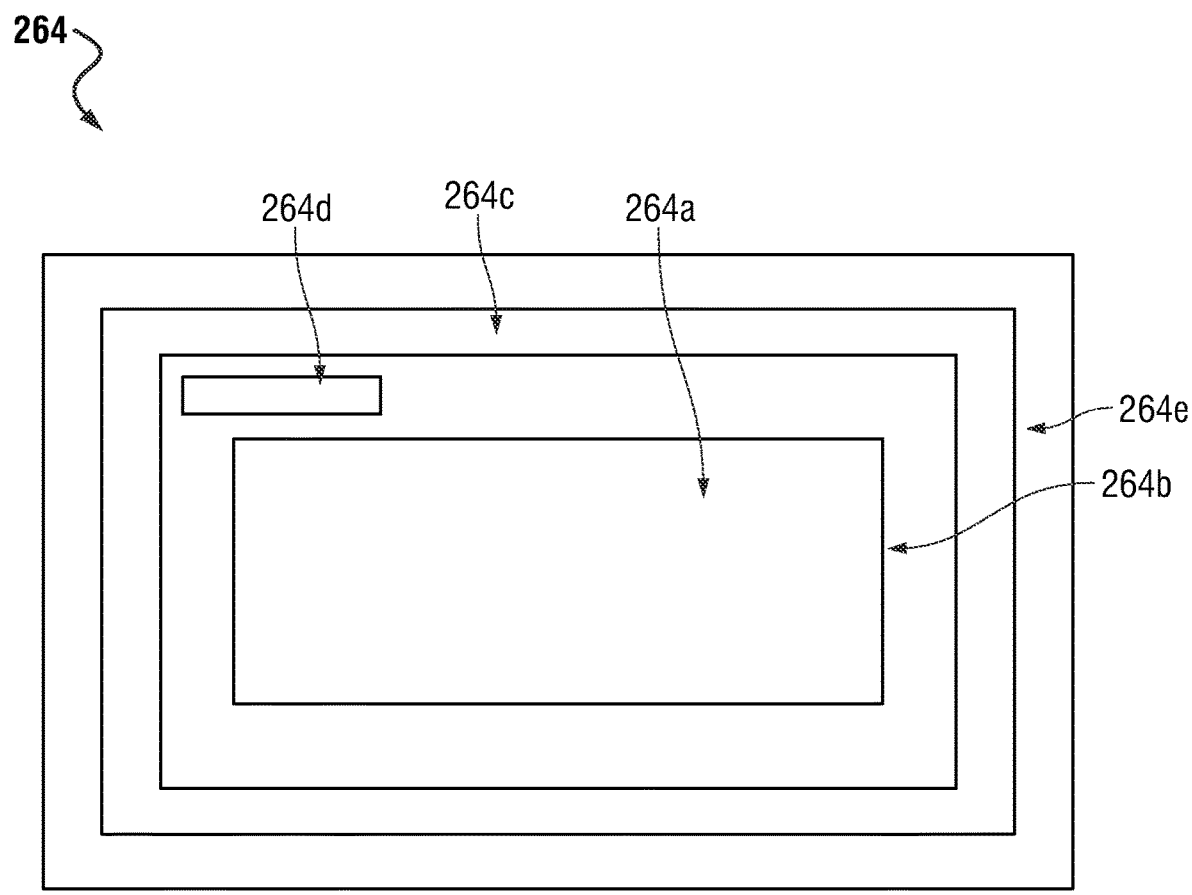
FIG. 2 is a block diagram illustrating a wax encapsulated antenna according to an embodiment of the present disclosure.

FIG. 2 is a block diagram illustrating a cross-sectional view of a wax encapsulated antenna 264 operating as a thermal battery to absorb thermal energy of an antenna element according to an embodiment of the present disclosure. As described herein, an antenna element 264a in an embodiment may operate to transmit data in bursts according to the 5G communication standard. Such burst transmission in an embodiment may involve the antenna element 264a drawing high amounts of power, causing the temperature of the antenna element 264a to increase. In order to limit the effect of such an antenna element temperature increase on the chassis surrounding or located nearby the antenna element 264a, the antenna element 264a may be disposed, either partially or wholly within an encapsulating thermal energy absorbing wax layer 264c disposed within an exterior casing 264e. Both the wax layer 264c and the exterior casing 264e in an embodiment may be comprised of radiofrequency (RF) transparent materials. The exterior casing 264e may be comprised of various plastics, for example, including polyethylene terephthalate (PET).

The antenna element 264a may be separated from the wax encapsulation layer 264c in an embodiment via an air gap layer 264b. In an example embodiment, the air gap layer 264b may be 0.2 mm wide. A temperature sensor 264d may be disposed between the wax encapsulation layer 264c and the antenna element 264a, within the air gap layer 264b. The temperature sensor 264d in such an embodiment may be operably connected to the network interface device, the processor or embedded controller executing the control system for thermal burst transport in a wax encapsulated antenna to communicate measured temperatures of the antenna element 264a encapsulated within the wax encapsulation layer 264c. Further, the wax encapsulation layer 264c may be disposed within a rigid casing or structure in an embodiment. In some embodiments, the rigid casing and the wax layer may be a removable structure that may be easily separated from the antenna element 264a and replaced during maintenance.

The wax encapsulation layer 264c in an embodiment may be comprised of various types of salts or waxes (e.g., organic or inorganic) known to comprise thermal batteries in the art. For example, the wax encapsulation layer 264c in an embodiment may be comprised of an organic wax material, such as a paraffin wax, with a crystalline phase transition temperature of 45 degrees Celsius. In other embodiments, the phase transition temperature of the wax encapsulation layer 264c may be different. The type of wax or salt material used within the wax encapsulation layer 264c, as well as the thickness of the wax encapsulation layer 264c (e.g., distance between the air gap layer 264b and the exterior surface of the wax encapsulation layer 264c) may affect the energy storage capabilities of the wax encapsulation layer 264c. For example, the wax encapsulation layer 264c in an embodiment may comprise a 0.5 mm thick layer of organic wax compound having a specific heat of 160 Joules per gram per degree Celsius. In such an embodiment, one gram of the wax encapsulation layer 164c compound may be capable of absorbing 160 Joules of energy per degree Celsius increase in temperature. In other words, the wax encapsulation layer in such an embodiment may be capable of absorbing 160 Joules of thermal energy emitted by the antenna element 264a as it increases in temperature by one degree Celsius.

In other embodiments using different types or thicknesses of energy absorbing materials (e.g., other waxes or salts), the amount of thermal energy absorbable by the wax encapsulating layer 264c may vary. This value may be determined for a specific material type and thickness prior to manufacture of the information handling system incorporating such a wax encapsulated antenna in an embodiment, and stored within a lookup table accessible by the control system for thermal burst transport in a wax encapsulated antenna. In other words, such a lookup table indicating an amount of energy (e.g., in Joules) the wax encapsulation layer 264c may be capable of absorbing as the antenna element 264a increases in temperature by one degree Celsius, based on the known number of grams of the wax compound used in the wax encapsulation layer 264c. As described in greater detail below with respect to FIG. 4, the control system for thermal burst transport in a wax encapsulated antenna may access this information in order to determine a length of time in which the wax encapsulated antenna may absorb thermal energy emitted by the antenna element 264a, as the antenna element 264a draws high power to facilitate a burst transmission.

Figure 3:
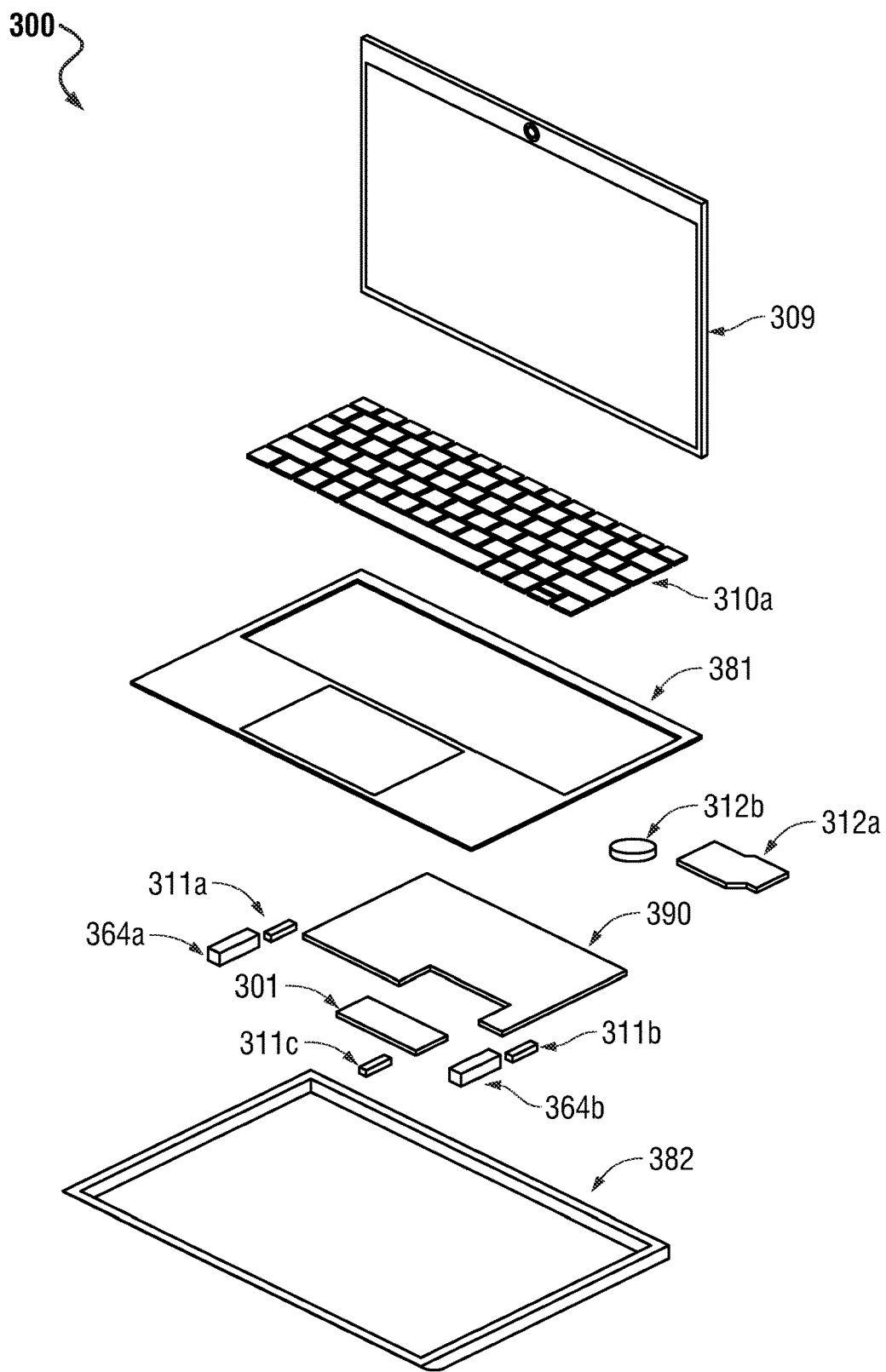
FIG. 3 is a graphical diagram illustrating an exploded view of components housed within a chassis rated for a maximum skin surface temperature according to an embodiment of the present disclosure.

FIG. 3 is a graphical diagram illustrating an exploded view of components of an information handling system 300 housed within a chassis rated for a maximum skin surface temperature according to an embodiment of the present disclosure. An information handling system 300 in an embodiment may comprise a video display 309, a keyboard 310a, a motherboard 390, a Central Processing Unit (CPU) 301, a conventional or existing cooling system 312a, a fan 312b, one or more antennas (e.g., 364a and 364b) and one or more temperature sensors (e.g., 311a, 311b, or 311c). A chassis comprising a bottom portion 382 and a palm rest portion 381 may enclose several components of the information handling system, including the antennas 364a and 364b. In an example embodiment, the chassis may have a chassis temperature rating limit between 40 and 50 degrees Celsius for a maximum skin temperature of the chassis that may come in contact with a user. Such a chassis in a particular example embodiment may be rated to have a max skin temperature at 45 degree Celsius to avoid harm or discomfort to a user who may come into contact with an external part of the chassis of information handling system 300. Various components not pictured here but described in greater detail with respect to FIG. 1 may also be enclosed within such a chassis.

As described herein, an information handling system 300 frequently coming into contact with a user's skin (e.g., hands, laps, etc.) may employ a variety of cooling mechanisms designed to ensure the portions of the exterior surface or "skin surface" of such devices that frequently contact a user's skin stay at or below temperatures most user's find comfortable. The components housed within a chassis (e.g., including portions 381 and 382) of such an information handling system in various embodiments described herein that are most likely to generate heat affecting the skin surface temperature include various processors (e.g., CPU 301, or graphics processing unit (GPU)), and antennas (e.g., 364a and 364b) used in wireless communication with networks connected to the internet.

Existing cooling systems 312a employ structures such as fans (e.g., 312b), heat sinks, cooling strips, and various cooling methods primarily pointed at capping or down-throttling power supplied to these heat-producing components (e.g., 301, 364a, or 364b). However, the new cellular 5G standard toward which communications for many mobile computing devices has shifted may utilize transmission of data in short bursts that markedly increase the power drawn by antennas (e.g., 364a or 364b) over a short time period. In order to capture the benefits of same of the new 5G standard capabilities, including greater data transmission speed, mobile computing device antennas (e.g., 364a or 364b) may perform such burst transmissions routinely. Existing cooling methods (e.g., as controlled by 312a) intended to keep skin temperatures at or below a user's comfort level may involve throttling of power delivered to the antenna (e.g., 364a or 364b) during such bursts, and inhibiting such bursts to occur or complete.

The control system for a thermal burst transport in a wax encapsulated antenna executed by the network interface device, CPU 301 or an embedded controller in an embodiment may address these issues by delaying default cooling mechanisms (e.g., as controlled by 312a) involving throttling of power delivered to the antenna (e.g., 364a or 364b) long enough for 5G burst transmissions to occur. In embodiments described herein, the control system for thermal burst transport in a wax encapsulated antenna may ensure the skin temperature of the information handling system chassis (e.g., 381 or 382) housing such near 5G antennas (e.g., 364a or 364b) does not exceed a threshold comfort value by transceiving data in such bursts via a wax encapsulated antenna capable of absorbing heat generated during burst transmission, as described in greater detail above with respect to FIG. 2.

The control system for thermal burst transport in a wax encapsulated antenna in embodiments described herein may receive temperature measurements (e.g., as described above with reference to FIG. 2 at 264d) from a thermal sensor incorporated at the wax encapsulated antenna (e.g., 364a or 364b) and trigger a countdown timer when the antenna temperature rises to the known phase transition point for the wax coating of the antenna (e.g., 364a or 364b). As described in greater detail below with respect to FIG. 4, the control system for thermal burst transport in a wax encapsulated antenna may set the countdown timer to expire prior to depleting the wax encapsulating material's ability to absorb heat generated by the antenna during a burst transmission in an embodiment.

Figure 4:
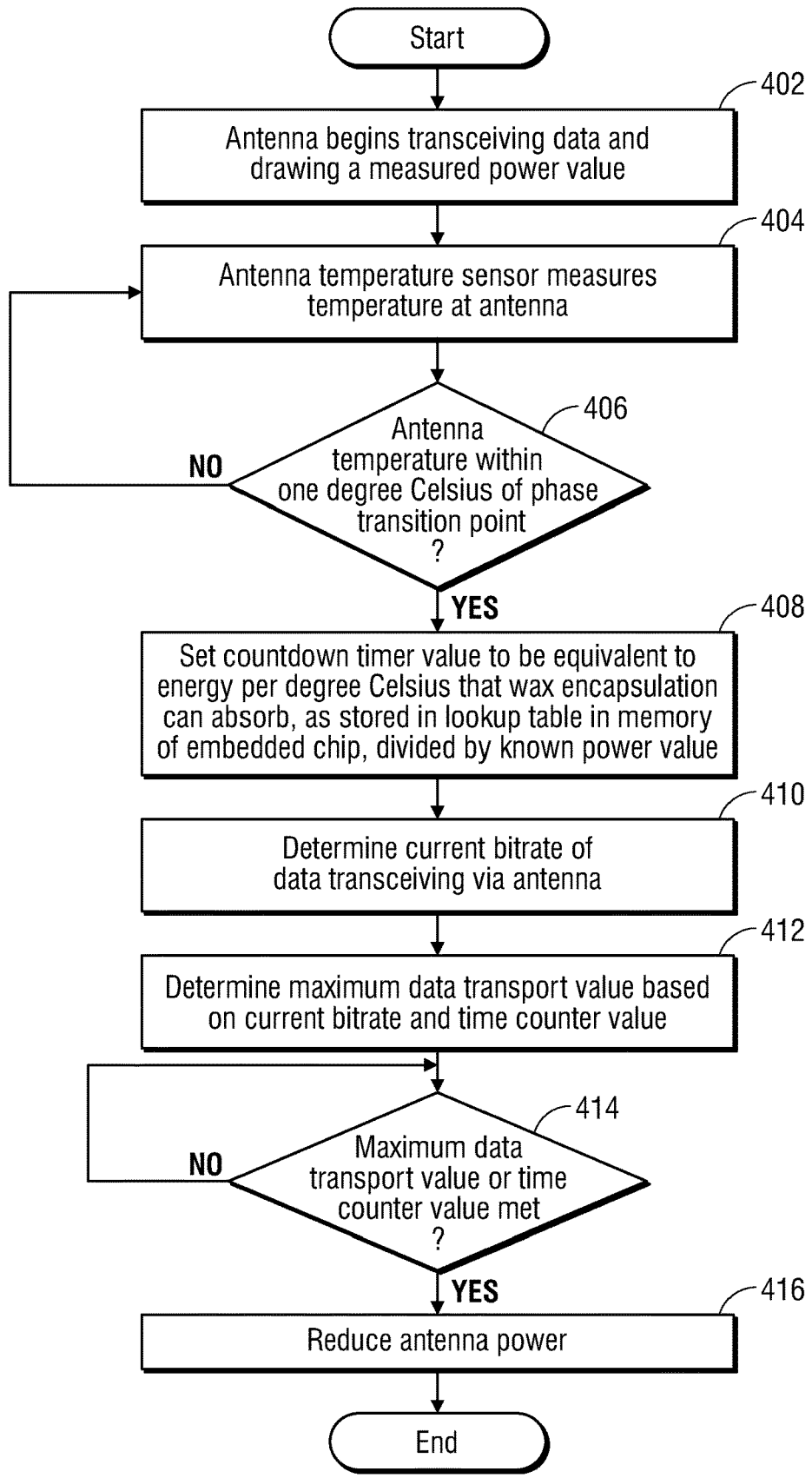
FIG. 4 is a flow diagram illustrating a method of extending length of burst capability for a wax encapsulated antenna according to an embodiment of the present disclosure.

FIG. 4 is a flow diagram illustrating a method of extending the time duration of transmission burst capability using a wax encapsulated antenna, while controlling a maximum skin surface temperature for a chassis housing the wax encapsulated antenna, according to an embodiment of the present disclosure. As described herein, the control system for thermal burst transport in a wax encapsulated antenna may set a countdown timer to expire prior to depleting the wax encapsulating material's ability to absorb heat generated by the antenna during a burst transmission. Once this countdown timer has run to zero, the control system for thermal burst transport in a wax encapsulated antenna may trigger existing thermal control systems to throttle power to the antenna, limit burst frequency, or suspend burst operation in order to maintain the skin surface temperature of the chassis housing the antenna.

At block 402, the wax encapsulated antenna may begin transceiving data and begin drawing a known amount of power from the power management unit. For example, in an embodiment described with reference to FIG. 1, the power management unit may supply one Watt of power to the wax encapsulated antenna 164 for transceiving of data in a burst. In other embodiments, the power management unit may deliver other amounts of power. The control system for thermal burst transport in wax encapsulated antenna 140 in an embodiment may determine the known Wattage supplied to the wax encapsulated antenna 164 via communication with the power management unit 104, or the network interface device 160, for example. In some embodiments, the network interface device 160 may include a power amplifier 165 operating to amplify the amount of power supplied to the wax encapsulated antenna 164. In such an embodiment, the network interface device 160 may indicate to the control system for thermal burst transport in a wax encapsulated antenna 140 the amount of amplified power being drawn by the wax encapsulated antenna 164 at a given time.

In some embodiments, beginning transmission of a data burst in such a way may trigger initiation of a countdown timer, such as described in greater detail below with respect to block 408. In one example embodiment, the wax encapsulated antenna 140 may have a known ability to absorb heat generated by the burst transmission and have an estimated duration that such burst transmissions may occur. In this embodiment, the system may not need to rely upon a temperature sensor to begin and may rely on the properties of the wax encapsulated antenna 140, measured power levels, or data transmission bitrate levels in various embodiments. In such an embodiment, blocks 404 and 406 may be skipped. In a further embodiment, a temperature sensor at the skin surface of the chassis or elsewhere in the information handling system chassis may detect skin surface temperature before implementing antenna burst transmission power throttling, reduction of burst transmission frequency, suspension of burst transmissions or other measures to limit additional heating of the chassis skin surface near a 5G radio module.

An antenna temperature sensor may also measure the temperature at the antenna in some embodiments at block 404. For example, in an embodiment described with reference to FIG. 2, the temperature sensor 264d, located between the antenna element 264a and the wax encapsulation layer 264c may measure the temperature of the antenna element 264a. As described with reference to FIG. 1, this antenna element temperature may be measured by the temperature sensor 111 and transmitted to the control system for thermal burst transport in a wax encapsulated antenna 140.

At block 406, a control system for thermal burst transport in wax encapsulated antenna may determine whether the antenna temperature is within one degree Celsius of a phase transition point in an embodiment. For example, in an embodiment described with reference to FIG. 2, the control system for thermal burst transport in a wax encapsulated antenna may determine whether the temperature of the antenna element 264a, as measured by the temperature sensor 264d is between 44 degrees Celsius and 45 degrees Celsius. If the antenna temperature is within one degree Celsius of a phase transition point, this may indicate the wax encapsulation layer can absorb thermal energy for a limited time period, until the phase change is complete, and a countdown timer estimating the duration of that limited time period may need to be invoked at block 408. If the antenna temperature is not within one degree Celsius of a phase transition point, there may not yet be a need to trigger such a countdown timer, and the method may proceed back to block 404 for routine measurement of the wax encapsulated antenna temperature.

A countdown timer may be set to be equivalent to an energy per degree Celsius that the wax encapsulation surrounding the antenna can absorb in an embodiment at block 408. For example, in an embodiment described with reference to FIG. 2, the control system for thermal burst transport in a wax encapsulated antenna may make such a determination in an embodiment by referencing a stored lookup table indicating a known amount of energy that the wax encapsulation layer 264c can absorb while the antenna element 264a increases in temperature by one degree Celsius. More specifically, the lookup table in an embodiment may indicate that the wax encapsulation layer 264c can absorb 160 Joules of energy as the antenna element 264a increases in temperature (as measured by temperature sensor 264d) by one degree Celsius. As described herein, while the compound within the wax encapsulation layer undergoes a phase change, it can absorb this amount of energy without increases in temperature. In other words, although the antenna element 264a may be increasing in temperature, the exterior temperature of the wax encapsulation layer may remain stable during this phase transition, insulating the skin surface of the chassis from temperature fluctuation caused by the antenna element 264a drawing increased power for burst transport.

The duration of time in which such a phase change may occur may not be precisely known, but the control system for thermal burst transport in a wax encapsulated antenna in an embodiment may estimate this value based on the amount of energy known to be absorbable by the wax encapsulation layer as the temperature of the antenna element increases by one degree Celsius, the determination at block 406 that the antenna element is within one degree Celsius of the temperature at which the wax compound within the wax encapsulation layer completes this phase transition, and on the determined power being drawn by the antenna element, as determined at block 402. For example, the control system for thermal burst transport in a wax encapsulated antenna in an embodiment may estimate the duration of the phase change period by dividing the amount of energy known to be absorbable by the wax encapsulation layer, as retrieved from the lookup table, by the determined amount of power (e.g., in Watts) being drawn by the antenna element. In an example embodiment in which the antenna element is drawing one Watt of power and is encapsulated by a wax encapsulation layer capable of absorbing 160 Joules of energy as the antenna element increases in temperature by one degree Celsius, the control system for thermal burst transport in a wax encapsulated antenna may estimate the duration of the phase change process to be 160 seconds. In such an embodiment, the control system for thermal burst transport in a wax encapsulated antenna may set a countdown timer value to 160 seconds. This countdown timer value may represent a number of seconds that may elapse before the exterior surface temperature of the wax encapsulated antenna may begin to increase due to the high power drawn by the antenna. This countdown timer value may thus also indicate the duration of time that may elapse before conventional power throttling measures may need to be employed in order to maintain the skin surface temperature of the chassis at or below comfort levels.

At block 410, a current bitrate of data transceiving via the antenna may be determined. The countdown timer value determined at block 408 may only accurately predict the time period in which the wax encapsulation layer can effectively insulate the skin surface chassis regions if the antenna continues to draw the same or less power as determined at block 402. If the antenna increases the amount of power being drawn during this phase change period (e.g., as estimated by the countdown timer value), the wax encapsulation layer may complete the phase change period prior to the countdown timer elapsing. In order to account for this variability, the control system for thermal burst transport in a wax encapsulated antenna may also estimate the duration of time that may elapse before conventional power throttling measures may need to be employed based at least in part on the transceiving bitrate. For example, in an embodiment described with reference to FIG. 1, the control system for thermal burst transport in a wax encapsulated antenna 140 may determine the transceiving bitrate (e.g., 20 Gbit/s) via communication with the network interface device 160.

A maximum data transport value may be determined in an embodiment based on the current bitrate and time counter value at block 412. The control system for thermal burst transport in a wax encapsulated antenna in an embodiment may determine a maximum data transport value, indicating a number of bits that may be transceived by the antenna before the wax encapsulation layer has likely completed the phase transition process by multiplying the countdown timer value determined at block 408 by the current bitrate determined at block 410. For example, the control system for thermal burst transport in a wax encapsulated antenna in an embodiment in which the countdown timer value is 160 seconds and the current bitrate is 20 Gbit/s may determine a maximum data transport value of 3200 Gbits or 400 GB. This may indicate that the network interface device can transceive up to 400 GB of data via the wax encapsulated antenna before the energy absorbing capabilities of the wax encapsulation layer are depleted and conventional power throttling measures may be required.

At block 414, the control system for thermal burst transport in the wax encapsulated antenna may determine whether the maximum data transport value or time counter value have been met. If the maximum data transport value or time counter value has been met, this may indicate the ability of the wax encapsulation to absorb energy generated by the antenna may have been met, and that power to the antenna may need to be reduced in order to stay below required skin temperature thresholds. The method may then proceed to block 416 for reduction in antenna power. If the maximum data transport value or time counter value has not been met, this may indicate the ability of the wax encapsulation to absorb energy generated by the antenna has not yet been depleted. Block 414 may be repeated until the wax encapsulation energy absorption capacity has been met, in which case the method may proceed to block 416. In such a way, the control system for thermal burst transport in the wax encapsulated antenna may extend the time period in which the antenna may continue to transceive data at a higher power (e.g., by a time period equivalent to the time counter value).

In an embodiment in which the maximum data transport value or time counter value have been met, this may indicate conventional power throttling measures need to be employed, and the control system for thermal burst transport in a wax encapsulated antenna may trigger such methods at block 416. For example, in an embodiment described with reference to FIG. 3, the control system for thermal burst transport in a wax encapsulated antenna executed by the processor 301 may transmit an instruction to the cooling unit 312*a* to begin throttling power delivered to the antenna (e.g., 364*a* or 364*b*). As another example, in an embodiment described with reference to FIG. 1, the control system for thermal burst transport in a wax encapsulated antenna 140 may transmit an instruction to the power management unit 104 to throttle power supplied to the wax encapsulated antenna 164. As yet another example, the control system for thermal burst transport in a wax encapsulated antenna 140 may transmit an instruction to the network interface device 160 to limit further burst transmissions or to suspend burst transmissions for a preset period of time. The method may then end.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system including a phase-changing compound encapsulated antenna, comprising:
   the phase-changing compound encapsulated antenna encapsulated in a phase-changing compound to absorb heat during transmission of burst signals that generate the heat for a discrete period of time;
   the phase-changing compound encapsulated antenna and the phase-changing compound enclosed within an outer phase-changing compound encapsulated antenna housing;
   a wireless interface device with a 5G or later generation radio to generate the burst signals to be transmitted via the phase-changing compound encapsulated antenna;
   an information handling system chassis having a skin surface coming into contact with human skin during execution of the information handling system;
   a temperature sensor to monitor an operable temperature of the phase-changing compound encapsulated antenna reaching a threshold temperature relative to a known phase transition point at which the phase-changing compound changes states at least partially from solid to liquid during the transmission of the burst signals; and
   the wireless interface device throttling power delivery to the phase-changing compound encapsulated antenna after a duration upon reaching the threshold temperature.

2. The information handling system of claim 1, wherein the antenna transceives data at or above a frequency of 6 GHz.

3. The information handling system of claim 1, wherein the phase-changing compound is an organic wax compound.

4. The information handling system of claim 1, wherein the temperature sensor is a thermocouple.

5. The information handling system of claim 1, wherein the temperature sensor is a thermistor.

6. The information handling system of claim 1 further comprising:
   a processor executing code instructions of a control system for thermal control during the transmission of the burst signals with the phase-changing compound encapsulated antenna to:
      initiate a timer having a number of seconds equivalent to a known heat capacity of the phase-changing compound multiplied by a measured mass of the phase-changing compound and divided by a measured power supplied to the antenna upon reaching the threshold temperature; and
      inhibit the throttling of the power delivery to the phase-changing compound encapsulated antenna until the timer has terminated, to allow the phase-changing compound to absorb energy emitted by the antenna during the burst signals of transceived data without increasing a skin temperature of the chassis skin surface.

7. The information handling system of claim 1 further comprising:
   a processor to determine, via a network interface device controlling the phase-changing compound encapsulated antenna, a transceiving speed of the transmission of the burst signals, and a data transport capacity value based on the transceiving speed and a timer; and
   the processor to inhibit the throttling of the power delivery to the phase-changing compound encapsulated antenna until the phase-changing compound encapsulated antenna has transceived data meeting the data transport capacity value following initiation of the timer.

8. An information handling system including a wax encapsulated antenna, comprising:
   the wax encapsulated antenna encapsulated in a wax compound to absorb heat;
   the wax encapsulated antenna and the wax compound enclosed within an outer wax encapsulated antenna housing a wireless interface device;
   a 5G radio to generate burst signals to be transmitted via the wax encapsulated antenna;

an information handling system chassis having a skin surface coming into contact with human skin during execution of the information handling system;

a first temperature sensor to monitor an operable temperature of the wax encapsulated antenna reaching a first threshold temperatures;

a processor executing code instructions of a for a thermal burst transport control system for the wax encapsulated antenna to:

initiate a timer having a number of seconds equivalent to a known heat capacity of the wax compound multiplied by a measured mass of the wax compound upon the first temperature sensor detecting the operable temperature of the wax encapsulated antenna reaching a first temperature threshold that is a phase transition point that is within one degree Celsius of a known temperature at which the wax compound at least partially changes states from solid to liquid;

determine, via a network interface device controlling the wax encapsulated antenna, a transceiving speed, and a data transport capacity value based on the transceiving speed and the timer; and inhibit the throttling of the power delivered to the wax encapsulated antenna until the timer has terminated or until the wax encapsulated antenna has transceived data meeting the data transport capacity value following initiation of the timer, whichever occurs earlier, to allow the wax compound to absorb energy emitted by the wax encapsulated antenna during a burst of the burst signals of transceived data without increasing a skin temperature of the chassis skin surface.

9. The information handling system of claim 8, wherein the outer wax encapsulated housing comprises a polyethylene terephthalate (PET) material.

10. The information handling system of claim 8, wherein the wax encapsulated antenna transceives data at or above a frequency of 6 GHz.

11. The information handling system of claim 8, wherein the wax compound is an organic wax compound.

12. The information handling system of claim 8, wherein the temperature sensor is a thermocouple.

13. The information handling system of claim 8, wherein the temperature sensor is a thermistor.

14. The information handling system of claim 8 further comprising:

a second temperature sensor to determine a chassis skin operable temperature of an information handling system chassis to determine a temperature of the information handling system chassis; and the processor to throttle the power to the wax encapsulated antenna for the transmission of the burst signals when the chassis skin operable temperature reaches a second threshold temperature to override inhibiting the throttling of the power delivered to the wax encapsulated antenna.

* * * * *